United States Patent [19]

Shupe

[11] 3,843,258

[45] Oct. 22, 1974

[54] DUAL BEAM ABSORPTION TYPE OPTICAL SPECTROMETER

[75] Inventor: David M. Shupe, Troy, Mich.

[73] Assignee: The Bendix Corporation, Southfield, Mich.

[22] Filed: Oct. 26, 1973

[21] Appl. No.: 410,145

Related U.S. Application Data

[63] Continuation of Ser. No. 174,746, Aug. 25, 1971, abandoned.

[52] U.S. Cl.................... 356/88, 250/573, 250/575, 356/96, 356/114, 356/205
[51] Int. Cl...................... G01n 21/24, G01n 21/26
[58] Field of Search.............................. 331/94.5 A; 250/343–345, 339, 573, 575; 356/51, 88, 96, 97, 114, 204, 206

[56] References Cited
UNITED STATES PATENTS

| | | | |
|---|---|---|---|
| 3,287,556 | 11/1966 | Good............................ | 331/94.5 A |
| 3,588,253 | 6/1971 | Wittmann............................ | 356/93 |
| 3,784,307 | 1/1974 | Jackson et al........................ | 356/51 |
| 3,788,742 | 1/1974 | Garbuny............................ | 356/218 |

OTHER PUBLICATIONS

Bowman et al., Nature, Vol. 221, Feb. 1, 1969, pp. 456 and 457.

Hinkley, Applied Physics Letters, Vol. 16, No. 9, May 1, 1970, pp. 351–354.

*Primary Examiner*—Ronald L. Wibert
*Assistant Examiner*—F. L. Evans
*Attorney, Agent, or Firm*—John R. Benefiel; James R. Ignatowski

[57] ABSTRACT

A spectrometer particularly useful for determining the concentration of atmospheric pollutants along a path of substantial length. A tunable laser and an optical parametric oscillator provide two laser signals having slightly different wavelengths that are directed to strike a detector. One signal is absorbed by any predetermined pollutant material between the source and detector and the other is not. The difference between the intensities of the first and second signals striking the detector indicates the concentration of pollutant material along the path travelled by the beams. The tunable laser operates in the pulse mode and provides high intensity output signal pulses to maximize the signal to noise ratio of the signals reaching the detector.

5 Claims, 1 Drawing Figure

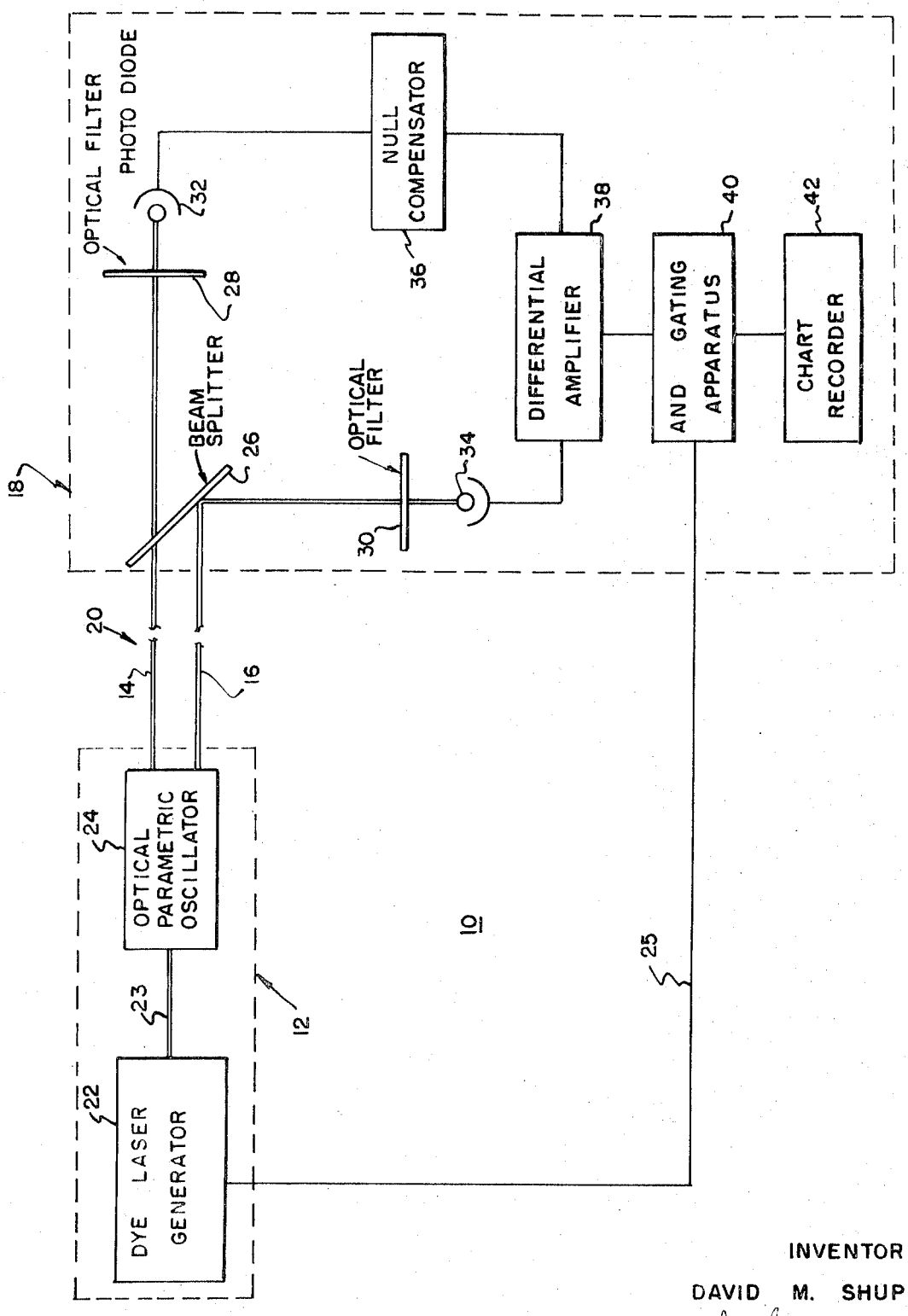

DUAL BEAM ABSORPTION TYPE OPTICAL SPECTROMETER

CROSS REFERENCE TO RELATED APPLICATION

This application is a continuation of my copending application Ser. No. 174,746, filed Aug. 25, 1971 entitled "A Dual Beam Absorption Type Optical Spectrometer," now abandoned.

BACKGROUND OF THE INVENTION

1. Field of the Invention

Optical Spectrometers for determining the concentration of a material along a path.

2. Brief Description of the Prior Art

Different materials absorb wave energies having different wavelengths. Dual-beam optical spectrometers useful in laboratory applications for measuring the concentration of a material, such as the concentration of a particular gas in a sample composed of several different gases are known. These laboratory spectrometers include a broad band source of ordinary or incoherent light, such as a glow-bar which emits a white light upon being heated, and a monochrometer, such as a grating which separates the white light into its spectral components. Each component has a different wavelength. Part of a component that is readily absorbed by the material whose concentration is to be measured is projected through the sample. The amount of energy that is absorbed from this signal component is proportional to the concentration of the absorbing material in the sample. The remainder of the signal component passes through a non-absorbing region. A measurement of the concentration of the absorbing material is obtained by measuring the relative intensities of the two signals after they have passed through the sample and non-absorbing regions.

One significant drawback of this type of mass spectrometer is that it cannot be used as a field instrument for measuring the concentration of a material along a long path. A glow-bar or similar source of incoherent light provides a relatively weak signal that diverges as it propagates through space. A monochrometer, such as a grating, divides the broad band signal into a substantial number of different components and thus further weakens the intensity of any particular component by a significant amount. The apparatus for measuring the relative intensities of the readily absorbed and the reference signal must, therefore, be positioned so that these signals do not travel more than a few feet before they are received and measured. Otherwise, the signals will not have sufficient intensities to permit measurements to be made.

It has been recognized that, at least in theory, coherent laser radiation could be used to measure the concentration of a material such as a pollutant along a path of substantial length, such as along a section of a freeway. However, there are a number of significant requirements that any practical, operating embodiment must meet, and no spectrometer using coherent radiation has thus far been designed that meets these requirements. That is, the laser generating apparatus in such a spectrometer must be capable of providing a large number of different output signals having different wavelengths. Different materials absorb wave energy having different wavelengths. The spectrometer must be capable of providing different output signals that permit an operator to measure the concentration of any one of a great number of different materials in which he may be interested. In addition, the laser generating apparatus must also provide two signals whose intensities do not vary with respect to each other. Erroneous measurements would be produced if the signal generating apparatus allowed the intensities of the signals being generated to vary with respect to each other, as could occur in a system employing two entirely separate signal generators. And finally, the reference signal must have a wavelength that is only slightly different from the wavelength of the signal to be absorbed by the material of interest. The two signals must have different wavelengths so that one will be absorbed while the other will not. The signals must have closely related wavelengths so that other factors affecting one signal will effect both signals equally. That is, dust particles, thermal gradients, and wind currents cause laser signals travelling over a long distance to be scattered and thus reduce the intensity of the signals reaching the detector. The wavelengths of both signals must be sufficiently close so that these factors affect both signals equally.

SUMMARY OF THE INVENTION

The subject invention comprises an absorption type optical spectrometer having a tunable laser generator for providing a laser signal and a parametric oscillator for receiving and dividing the laser signal into two coherent output signals having different wavelengths. One of the output signals provided by the parametric oscillator has a wavelength such that it is absorbed by any of a predetermined material along the path which the signals travel. The amount of energy that is absorbed is proportional to the concentration of the absorbing material along the path travelled. The other signal is a reference signal that has a slightly different wavelength and therefore is not absorbed by the predetermined material. Measuring apparatus is positioned to receive the two signals after they have travelled through an area of interest, and measure the relative intensities of those signals in order to determine the amount of the one signal that has been absorbed.

The optical spectrometer of this invention is capable of measuring the concentration of a material along a very long path. The tunable laser generator provides a highly coherent, high intensity output laser signal. As used herein, the term "laser signal" is not limited to the visible spectrum but encompasses all signals having a wavelength proximate an absorbing wavelength of a material whose concentration is to be measured. Coherent infrared and ultraviolet signals are laser signals. The parametric oscillator divides the laser signal provided by the laser generator into two output signals having slightly different frequencies, while minimizing any loss in signal coherence or intensity. The output signals provided by the oscillator can, therefore, be projected over a substantial distance that may be as long as several thousand feet or several miles before striking a detector to be measured.

The spectrometer of this invention can also be used to measure concentrations of a great number of different materials. Tunable lasers are available that are capable of providing output signals at a great many different wavelengths. The embodiment illustrated herein includes a dye laser generator, which is a tunable laser capable of providing a particularly large number of different wavelength output signals. In addition, the spectrometer of this invention provides very precise measurements. That is, since both the reference signal and the signal to be absorbed are produced using only one laser generator, the intensities of these signals will not vary with respect to each other to produce any erroneous measurements. In addition, the optic parametric oscillator receiving the signal from the laser generator divides that signal into two signals having closely related wavelengths so that any factor other than the absorption of one signal by any particles of a predetermined material along the path of interest, will effect both signals equally. Measured differences in the intensities of the two signals provided by the spectrometer of this invention, therefore, accurately reflect the amount of absorbing material along the path travelled by those signals.

In order to maximize the signal to noise ratio in the measurement provided by the spectrometer illustrated herein, the laser generating apparatus operates in the pulse mode and provides short, high intensity laser output pulses. The high intensity of the output pulses maximizes the signal to noise ratio of the signals received by the signal measuring apparatus of this spectrometer. In addition, the laser generating apparatus provides an electric output signal pulse that is synchronous with each laser output pulse so that the measuring apparatus receives both the laser signals and the electric signal simultaneously. The measuring apparatus includes a gating circuit responsive to both the synchronous electric signal and representations of the laser signals. This gating circuit prevents the measurement of any noise signal received by the measuring apparatus during the time interval in which no laser signals are received from the laser generator from being included in the output measurement provided by the spectrometer. The synchronous electric signal and gating apparatus thus further reduce the noise content of the signal measurements provided by the spectrometer of this invention.

BRIEF DESCRIPTION OF THE DRAWINGS

Further objects, features, and advantages of this invention, which is defined by the appended claims, will become apparent from a consideration of the following description and the accompanying drawing which is a schematic circuit diagram of one embodiment of this invention.

DETAILED DESCRIPTION OF THE PREFERRED EMBODIMENT

The FIGURE illustrates a dual beam absorption type optical spectrometer 10 having signal generating apparatus 12 for providing two coherent wave energy signals, namely laser signals 14 and 16, and measuring apparatus 18 for receiving and measuring the intensities of the signals provided by generating apparatus 12 after they have traversed a sample containing region 20. The signal generating apparatus 12 includes a dye laser generator 22 which provides a laser signal 23. An optical parametric oscillator 24 receives the laser signal 23 from generator 22 and divides that signal to provide the two output signals 14 and 16 having slightly different wavelengths. Signal 14 has a wavelength such that signal will be absorbed by any particles of a predetermined material in sample region 20. Signal 16 has a wavelength slightly offset from signal 14 so that it will not be absorbed by the predetermined material, but so that all other factors attenuating signal 14 will also provide an equal attenuation to signal 16.

A dye laser generator is a known tunable generator formed from an organic dye lasing material dissolved in a host material, such as menthanol. It is advantageous to use this generator in the spectrometer 10 because the generator can be tuned to provide many different output signals having different wavelengths. The dye laser generator, therefore, permits the concentration of many different materials to be measured. In addition, dye lasers can be readily operated in the pulse mode to produce output pulses having higher energies than can be obtained from laser generators operating in the continuous wave mode. The high intensity of the output signal provided by dye laser generator 22 maximizes the signal-to-noise ratio of the signals received by measuring apparatus 16. Dye laser generator 22 also provides an electric signal that is transmitted along line 25 to signal measuring apparatus 18. The transmission of the electric signal along line 25 is synchronous with the transmission of signals 14 and 16 so that all three signals are received by the measuring apparatus 18 at the same time. The synchronized electric signal received by the measuring apparatus 18 thus indicates to that measuring apparatus when signals 14 and 16 are being received. This signal, therefore, further increases the signal-to-noise ratio of the measurements provided by apparatus 18 by preventing noise signals received at a time when signals 14 and 16 are not being received from being included in the output measurements provided.

An optical parametric oscillator is also a known device that will divide a received laser signal into two different output signals having slightly different wavelengths with a minimum loss in coherence and intensity. An optical parametric oscillator, such as oscillator 24, can also be made to polarize the two output signals 14 and 16 in different directions. This difference in the direction of polarization of signals 14 and 16 facilitate the measurement of those signals. The concept of an optical parametric oscillator has been known since about 1962, and successful embodiments have been produced since about 1965. The development of these devices is summarized in "Optical Parametric Oscillators," *Proceedings of the IEEE*, Vol. 57, No. 12, December 1969, pp. 2096 by S. E. Harris.

The measuring apparatus 18 for measuring the relative intensities of the signals 14 and 16 includes a polarizing beam splitter 26 which separates those two signals in accordance with the polarizations provided by oscillator 24. Two optical polarization filters 28 and 30 are disposed to receive and remove unwanted components from signals 14 and 16 respectively. These filtered signals are transmitted to two photodiodes 32 and 34, respectively, which convert the filtered optic signals to electric signals. A null compensator 36 receives the electric signal provided by photodiode 32 and adjusts the intensity of that signal by a predetermined amount that would cause the output signal from null compensator 36 to have an intensity equal to the intensity of the electric signal provided by photodiode 34 if there were no absorbing material in sample region 20 to reduce the intensity of signal 14. A differential amplifier 38 receives the output signals from photodiode 34 and from null compensator 36, and provides an output signal proportional to the difference between the two received signals. The output signal from amplifiers 38 thus represents the difference between the intensities of signals 14 and 16 received by signal measuring apparatus 18. And, since the difference between the intensities of those two beams is determined by the quantity of a predetermined energy absorbing material in sample region 20, the output from differential amplifier 38 represents the concentration of that material.

The output signal from amplifier 38 is transmitted to an AND gating apparatus 40 which also receives the synchronizing signal provided by laser generator 22. When AND gating apparatus 40 receives the synchronized signal provided by generator 22, it transmits the output signal provided by amplifier 38 to a chart recorder 42 which provides a record of measurements made for an observer. AND gating apparatus blocks the propagation of signals to chart recorder 42 when no synchronizing signal is received from generator 20, and thus prevents measurements of noise signals received by measuring apparatus 18 during the time interval between reception of subsequent signal pulses from source apparatus 12 from being measured and included in the output measurements provided by the spectrometer 10.

In operation, the spectrometer 10 can be used as a field instrument to measure the concentration of a predetermined material along paths of several thousand feet or several miles. The source apparatus 12 may therefore be spaced a substantial distance from measuring apparatus 18. The optical spectrometer 10 can, therefore, be readily used to detect atmospheric pollutants. A substantial number of these pollutants, such as the unburned hydrocarbons and aldahydes produced by automobile engines, absorb energy at wavelengths between 3.5 and 3.7 microns. To illustrate the advantages and operations of this invention, consider an example in which it is desired to determine the concentration of a pollutant that absorbs energy having a wavelength of say 3.61 microns. Dye laser generator 22 is tuned to provide an output signal pulse having a wavelength slightly offset from one-half of the 3.61 micron absorption wavelength, such as a 1.8 micron wavelength signal. Optical parametric oscillator 24 receives and divides the 1.8 micron wavelength signal provided by generator 22 to provide output signal pulse 14 having a wavelength of 3.61 microns and output signal pulse 16 having a wavelength of 3.59 microns. This slight difference between the wavelength of the signals 14 and 16 causes signal 14 to be absorbed by the pollutant material while signal 16 is unaffected by that material. However, the signals are sufficiently closely related so that other attenuating factors, such as scattering of the signals caused by dust particles in the atmosphere, will have an equal effect on both signals. The measurement provided by measuring apparatus 18 of the difference between the intensities of signals 14 and 16 is thus an accurate indication of the concentration of the predetermined pollutant material in region 20.

The spectrometer 10 can be readily used to measure the concentration of any material whose absorbing wavelength is known by utilizing the equation:

$$1/\lambda_s = 1/\lambda_1 + 1/\lambda_2$$

where:

$\lambda_s$ = the wavelength of the output from wave generator 18;

$\lambda_1$ = the wavelength of signal 22, which is a wavelength of energy that is readily absorbed by the material being analyzed in region 14; and $\lambda_2$ = the wavelength of signal 24 which is offset slightly from the wavelength of signal 22.

Oscillator 24 receives a signal having a wavelength $\lambda_s$ and provides two output signals having closely related wavelengths $\lambda_1$ and $\lambda_2$. Therefore, in order to measure the concentrations of a material having a wavelength $\lambda_1$, laser generator 22 is simply tuned to provide an output signal having a wavelength that is slightly offset from one-half the wavelength $\lambda_1$ and that satisfies the above equation.

Having thus described one embodiment of the invention, a number of modifications will occur to those skilled in the art.

What is claimed is:

1. A dual beam spectrometer for measuring the concentration of various materials along a path of substantial length comprising:

means for generating two coherent wave energy signals, the first signal of said two signals being polarized in a first direction and having a first variable wavelength and the second signal of said two signals being polarized in a second direction different from said first direction and having a second variable wavelength slightly different from and synchronously variable with said first variable wavelength wherein said slight difference in wavelengths is a difference which is sufficiently large so that only said first signal is readily absorbed by one of said various materials and sufficiently small so that all other factors affecting said first signal affect said second signal equally; and means for simultaneously receiving and measuring the difference between the relative intensities of said two signals, wherein said two signals are separated one from the other in accordance with their direction of polarization whereby the intensity of each of said two signals may be measured separately and wherein said difference in intensities being directly proportional to the concentration of said one material.

2. The spectrometer of claim 1 wherein said means for generating two coherent wave energy signals comprises:

means for generating a source signal of coherent wave energy including means for varying the wavelength of said source signal; and means receiving said source signal for dividing said source signal into two simultaneously emitted output signals wherein one of said emitted output signals is said first signal and the other of said emitted output signals is said second signal; and said means for measuring the difference comprises:

polarization sensitive means for optically separating said first signal from said second signal and directing said separated first and second signals along different optical paths; and means for independently receiving said separated first and second signals and for measuring the difference between the relative intensities of said first and said second signals.

3. The spectrometer of claim 2 wherein said means for generating said source signal is a tunable dye laser and said means for dividing is a parametric oscillator.

4. The spectrometer of claim 3 wherein:
said tunable dye laser is adjusted to generate a source signal having a wavelength that is slightly different from one-half the wavelength of the absorption wavelength of said one material; and
said parametric oscillator divides said laser signal to provide said two coherent output signals having wavelengths satisfying the equation $$1/\lambda_s = 1/\lambda_1 + 1/\lambda_2$$

where:
$\lambda_s =$ the wavelength of the coherent source signal emitted by said tunable laser;
$\lambda_1 =$ the wavelength of said first coherent signal emitted by said parametric oscillator; and
$\lambda_2 =$ the wavelength of said second coherent signal emitted by said parametric oscillator.

5. The spectrometer of claim 1 wherein:
said means for generating two coherent wave energy signals includes means for operating said means for generating in a pulse mode providing output signals comprising high intensity pulses of coherent wave energy and electrical output signals synchronous with the emission of said coherent wave energy pulses;
said measuring means further includes:
means for receiving said coherent wave energy signal pulses and providing an electric representation of said received signal pulses; and
gating means responsive to said electric representations and said synchronous electric signals for preventing said measuring means from providing an output comprising a measurement of noise signals received by said measuring means during the time when no coherent signal pulses from said generating means are received by said measuring means.

* * * * *